United States Patent
Hewett et al.

(10) Patent No.: US 9,411,799 B2
(45) Date of Patent: Aug. 9, 2016

(54) METHODS, APPARATUSES, SYSTEMS AND COMPUTER READABLE MEDIUMS TO CREATE DOCUMENTS AND TEMPLATES USING DOMAIN ONTOLOGY CONCEPTS

(75) Inventors: Andrew John Hewett, Erlangen (DE); Martin Huber, Uttenreuth (DE); Gerhard Kohl, Neunkirchen am Brand (DE); Markus Metz, Weisendorf (DE); James Pressler, Exton, PA (US); Michael Rusitska, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 247 days.

(21) Appl. No.: 13/440,569

(22) Filed: Apr. 5, 2012

(65) Prior Publication Data

US 2013/0268852 A1    Oct. 10, 2013

(51) Int. Cl.
*G06Q 50/00*    (2012.01)
*G06F 17/24*    (2006.01)

(52) U.S. Cl.
CPC .................... *G06F 17/248* (2013.01)

(58) Field of Classification Search
CPC . G06F 17/21; G06F 17/248; G06F 17/30734; G06F 17/1243; G06F 17/2247; G06F 17/227; G06F 17/243; G06F 17/30905; G06F 17/3089
USPC .................... 715/222, 235, 224, 225
See application file for complete search history.

(56) References Cited

U.S. PATENT DOCUMENTS

| | | | | |
|---|---|---|---|---|
| 7,801,740 | B1 * | 9/2010 | Lesser | G06Q 30/04 600/300 |
| 8,433,715 | B1 * | 4/2013 | Mirhaji | 707/756 |
| 2003/0216913 | A1 * | 11/2003 | Keely et al. | 704/235 |
| 2012/0096015 | A1 * | 4/2012 | Koomullil et al. | 707/749 |
| 2012/0197832 | A1 * | 8/2012 | Shanmukh et al. | 706/46 |
| 2012/0215557 | A1 * | 8/2012 | Flanagan | G06Q 50/24 705/3 |
| 2012/0215559 | A1 * | 8/2012 | Flanagan | G06Q 10/10 705/3 |
| 2012/0245961 | A1 * | 9/2012 | Yegnanarayanan | G10L 15/26 705/3 |
| 2013/0212475 | A1 * | 8/2013 | Lee | G06F 17/276 715/261 |
| 2013/0246098 | A1 * | 9/2013 | Habboush | G06Q 10/10 705/3 |
| 2013/0297347 | A1 * | 11/2013 | Cardoza | G06F 19/322 705/3 |
| 2013/0297348 | A1 * | 11/2013 | Cardoza | G06F 19/322 705/3 |

* cited by examiner

*Primary Examiner* — Scott Baderman
*Assistant Examiner* — Hassan Mrabi
(74) *Attorney, Agent, or Firm* — Harness, Dickey & Pierce, P.L.C.

(57) ABSTRACT

A document and template creation system includes a document and template creation device. The document and template creation device is configured to identify at least one domain ontology concept based on at least a portion of a text-string input into a document, propose the at least one domain ontology concept for selection by the user, and insert at least one of the at least one domain ontology concept into the document in response to selection by the user.

17 Claims, 16 Drawing Sheets

---

CLINICAL INDICATION: Pancreatitis

The patient is a [ ]-year-old [female | male] presenting with abdominal pain characteristic of acute pancreatitis with lipase [] times the upper limit of normal.

COMPARISON: [<date> | None]

TECHNIQUE:

3 mm spiral images were obtained from the diaphragm through the iliac crests before and after IV administration of [150] ml low osmolar contrast material (300 mgI/ml). The images were obtained during the arterial phase of contrast-enhancement.

CT radiation dose:    CTDIvol total: [ ] mGy

FINDINGS:

ABDOMEN:

The pancreas is [mildly | moderately | severely] enlarged. There are marked inflammatory changes surrounding the [lateral part | neck | body | head | uncinate process | tail] of the pancreas, consistent with [acute pancreatitis | chronic pancreatitis].

The liver, spleen, kidneys, gallbladder and adrenal glands grossly within normal limits. No obstruction of bowel. No free intraperitoneal air.

PELVIS:

The bladder and pelvic viscera are grossly normal. There is no free fluid, lymphadenopathy or suspicious osseous lesions.

IMPRESSION:

[Acute pancreatitis | Chronic pancreatitis]

CLINICAL INDICATION: ⟵ 407

The patient is a [] year-old [female|male] presenting with abdominal.

COMPARISON: [<date> | None]

TECHNIQUE:

[3mm spiral|5mm spiral]

CT radiation dose:    CTDIvol total: [] mGy

FINDINGS: ⟵ 409

ABDOMEN: ⟵ 414

The liver, spleen, kidneys, pancreas, gallbladder and adrenal glands grossly within normal limits. No obstruction of bowel. No free intraperitoneal air.

PELVIS: ⟵ 416

The bladder and pelvic viscera are grossly normal. There is no free fluid, lymphadenopathy or suspicious osseous lesions.

IMPRESSION: ⟵ 411

FIG. 3

CLINICAL INDICATION: [_____] ← 412

The patient is a [75]-year-old [male] presenting with abdominal pain.
            ↑ 402      ↑ 404

COMPARISON: [None]
                  ↖ 406
TECHNIQUE:
      ← 410
[3mm spiral|5mm spiral]
                        ← 408
CT radiation dose:    CTDIvol total: [14,1] mGy

FINDINGS:

ABDOMEN:

The liver, spleen, kidneys, pancreas, gallbladder and adrenal glands grossly within normal limits. No obstruction of bowel. No free intraperitoneal air.

PELVIS:

The bladder and pelvic viscera are grossly normal. There is no free fluid, lymphadenopathy or suspicious osseous lesions.

IMPRESSION:

FIG. 4

CLINICAL INDICATION: Pancreatitis ◄――― 412

The patient is a 75-year-old male presenting with abdominal pain.

COMPARISON: None.

TECHNIQUE:

[3mm spiral|5mm spiral]

CT radiation dose:　　CTDIvol total: 14,1 mGy

FINDINGS:

ABDOMEN:

The liver, spleen, kidneys, pancreas, gallbladder and adrenal glands grossly within normal limits. No obstruction of bowel. No free intraperitoneal air.

PELVIS:

The bladder and pelvic viscera are grossly normal. There is no free fluid, lymphadenopathy or suspicious osseous lesions.

IMPRESSION:

FIG. 5

CLINICAL INDICATION: Pancreatitis

407

The patient is a 75-year-old male presenting with abdominal pain characteristic of acute pancreatitis with lipase 2 times the upper limit of normal.

COMPARISON: None.

TECHNIQUE: 410

[3mm spiral|5mm spiral]

CT radiation dose:   CTDIvol total: 14,1 mGy

FINDINGS:

ABDOMEN:

The liver, spleen, kidneys, pancreas, gallbladder and adrenal glands grossly within normal limits. No obstruction of bowel. No free intraperitoneal air.

PELVIS:

The bladder and pelvic viscera are grossly normal.  There is no free fluid, lymphadenopathy or suspicious osseous lesions.

IMPRESSION:

FIG. 7

CT ABDOMEN AND PELVIS WITHOUT AND WITH CONTRAST

CLINICAL INDICATION: Pancreatitis

The patient is a 75-year-old male presenting with abdominal pain characteristic of acute pancreatitis with lipase 2 times the upper limit of normal.

COMPARISON: None.

TECHNIQUE:

3 mm spiral images were obtained from the diaphragm through the iliac crests before and after IV administration of [150] ml low osmolar contrast material (300 mgI/ml). The images were obtained during the arterial phase of contrast-enhancement.

CT radiation dose:    CTDIvol total: 14,1 mGy

FINDINGS:

ABDOMEN:

The liver, spleen, kidneys, pancreas, gallbladder and adrenal glands grossly within normal limits. No obstruction of bowel. No free intraperitoneal air.

PELVIS:

The bladder and pelvic viscera are grossly normal.  There is no free fluid, lymphadenopathy or suspicious osseous lesions.

IMPRESSION:

FIG. 8

CT ABDOMEN AND PELVIS WITHOUT AND WITH CONTRAST

CLINICAL INDICATION: Pancreatitis

The patient is a 75-year-old male presenting with abdominal pain characteristic of acute pancreatitis with lipase 2 times the upper limit of normal.

COMPARISON: None.

TECHNIQUE:     — 410b 3 mm spiral images were obtained from the diaphragm through the iliac crests before and after IV administration of 170 ml low osmolar contrast material (300 mgI/ml). The images were obtained during the arterial phase of contrast-enhancement.

CT radiation dose:     CTDIvol total: 14,1 mGy

FINDINGS:

ABDOMEN:

The liver, spleen, kidneys, pancreas, gallbladder and adrenal glands grossly within normal limits. No obstruction of bowel. No free intraperitoneal air.

PELVIS:

The bladder and pelvic viscera are grossly normal. There is no free fluid, lymphadenopathy or suspicious osseous lesions.

IMPRESSION:

FIG. 9

CLINICAL INDICATION: Pancreatitis

The patient is a 75-year-old male presenting with abdominal pain characteristic of acute pancreatitis with lipase 2 times the upper limit of normal.

COMPARISON: None.

TECHNIQUE:

3 mm spiral images were obtained from the diaphragm through the iliac crests before and after IV administration of 170 ml low osmolar contrast material (300 mgI/ml). The images were obtained during the arterial phase of contrast-enhancement.

CT radiation dose:    CTDIvol total: 14,1 mGy

FINDINGS:

ABDOMEN:                                          414

The pancreas is moderately enlarged. There are marked inflammatory changes surrounding the head and the uncinate process of the pancreas, consistent with acute pancreatitis.

The liver, spleen, kidneys, gallbladder and adrenal glands grossly within normal limits. No obstruction of bowel. No free intraperitoneal air.

PELVIS:

The bladder and pelvic viscera are grossly normal. There is no free fluid, lymphadenopathy or suspicious osseous lesions.

IMPRESSION:                                      411

Acute Pancreatitis.

FIG. 10

CLINICAL INDICATION: Pancreatitis

The patient is a [] year-old [female | male] presenting with abdominal pain characteristic of acute pancreatitis with lipase 2 times the upper limit of normal.

COMPARISON: [<date> | None].

TECHNIQUE:

3 mm spiral images were obtained from the diaphragm through the iliac crests before and after IV administration of 170 ml low osmolar contrast material (300 mgI/ml). The images were obtained during the arterial phase of contrast-enhancement.

CT radiation dose:    CTDIvol total: [] mGy

FINDINGS:

ABDOMEN:

The pancreas is moderately enlarged. There are marked inflammatory changes surrounding the head and the uncinate process of the pancreas, consistent with acute pancreatitis.

The liver, spleen, kidneys, gallbladder and adrenal glands grossly within normal limits. No obstruction of bowel. No free intraperitoneal air.

PELVIS:

The bladder and pelvic viscera are grossly normal. There is no free fluid, lymphadenopathy or suspicious osseous lesions.

IMPRESSION:

Acute Pancreatitis.

FIG. 11

CLINICAL INDICATION: Pancreatitis

The patient is a [] year-old [female | male] presenting with abdominal pain characteristic of acute pancreatitis with lipase [] times the upper limit of normal.

COMPARISON: [<date> | None]

TECHNIQUE:

3 mm spiral images were obtained from the diaphragm through the iliac crests before and after IV administration of [150] ml low osmolar contrast material (300 mgI/ml). The images were obtained during the arterial phase of contrast-enhancement.

CT radiation dose:   CTDIvol total: [] mGy

FINDINGS:

ABDOMEN:

The pancreas is [mildly | moderately | severely] enlarged. There are marked inflammatory changes surrounding the [lateral part | neck | body | head | uncinate process | tail] of the pancreas, consistent with [acute pancreatitis | chronic pancreatitis].

The liver, spleen, kidneys, gallbladder and adrenal glands grossly within normal limits. No obstruction of bowel. No free intraperitoneal air.

PELVIS:

The bladder and pelvic viscera are grossly normal.  There is no free fluid, lymphadenopathy or suspicious osseous lesions.

IMPRESSION:

[Acute pancreatitis | Chronic pancreatitis].

FIG. 16

METHODS, APPARATUSES, SYSTEMS AND COMPUTER READABLE MEDIUMS TO CREATE DOCUMENTS AND TEMPLATES USING DOMAIN ONTOLOGY CONCEPTS

BACKGROUND

In many situations text templates (also called forms) are used to structure and standardize documents. These templates guarantee more complete, concise and consistent document content.

Conventionally, templates are created by one group of users, but used by another group of users to create documents. This separation into two groups is usually due to the fact that creating templates requires additional skills and/or rights. Often, specific "administration" modes and/or views of word processing systems are required to change or create templates. In some cases, completely separate software applications are used to change or create templates. This is restrictive in cases that frequently require creating new templates or changing existing templates. This is also restrictive in situations that require relatively frequent derivation of additional templates from existing ones.

Document templates are conventionally provided in libraries (e.g., stored on one or more file shares and/or web servers). The document templates are either: copied/downloaded to the local file system; installed using, for example, a macro of a word processor or dedicated software application; or accessed remotely (e.g., at one or more file shares and/or web servers).

After selecting/opening a template, the template can be edited and saved as a document. If a user wants to create a variant of a template, then the user must either learn to create templates or request that a responsible person/department in his organization create the template.

SUMMARY

At least one example embodiment provides a method of operating a document and template creation system. According to at least this example embodiment, the method includes: identifying at least one domain ontology concept based on at least a portion of a text-string input into a document; proposing the at least one domain ontology concept for selection by a user; and inserting at least one of the at least one domain ontology concept into the document in response to selection by the user.

According to at least some example embodiments, the text string may include at least one domain ontology concept from among a set of domain ontology concepts. A name or label corresponding to the set of domain ontology concepts may be proposed for selection by the user, and one or more domain ontology concepts may be inserted into the document based on selection of the proposed name or label by the user. The document may be a clinical document.

According to at least some example embodiments, the text string may be autocompleted based on the identified at least one domain ontology concept and a context of the portion of the text string in the document.

According to at least some example embodiments, the method may further include: analyzing the document to identify at least one candidate for structural content in the document; determining whether the at least one candidate exists in a library of existing domain specific structures; and inserting at least one domain specific structural element from the library of existing domain specific structures into the document based on the at least one candidate if the at least one candidate exists in the library of existing domain specific structures.

Still further, the method may include: identifying at least one domain ontology concept in a domain ontology database based on the candidate; and inserting structural content into the document based on the identified at least one domain ontology concept.

According to at least some example embodiments, the document may be analyzed to identify at least one candidate for structural content in the document, whether the at least one candidate exists in a library of existing domain specific structures may be determined, at least one domain ontology concept in a domain ontology database may be identified based on the at least one candidate if the at least one candidate does not exist in the library of existing domain specific structures, and structural content may be inserted into the document based on the identified domain ontology concept.

At least one other example embodiment provides a method of operating a document and template creation system to create a template. According to at least this example embodiment, the method includes: analyzing a document to identify at least one candidate for structural content; determining whether the at least one candidate exists in a library of existing domain specific structures; and inserting at least one domain specific structural element from the library of existing domain specific structures into the document based on the at least one candidate if the at least one candidate exists in the library of existing domain specific structures.

According to at least some example embodiments, the method may further include: identifying at least one domain ontology concept corresponding to the at least one candidate in a domain ontology database; and inserting structural content into the document based on the identified at least one domain ontology concept.

The at least one domain ontology concept may be identified by: identifying a parent node corresponding to the at least one candidate; and wherein the structural content is inserted into the document based on the identified parent node.

The structural content may be a pick list containing children of the identified parent node as options.

At least one other example embodiment provides a method of operating a document and template creation system to create a template. According to at least this example embodiment, the method includes: analyzing a document to identify at least one candidate for structural content; identifying at least one domain ontology concept corresponding to the at least one candidate in a domain ontology database; and inserting structural content into the document based on the identified at least one domain ontology concept.

According to at least some example embodiments, the at least one domain ontology concept may be identified by: identifying a parent node corresponding to the at least one candidate; and wherein the structural content is inserted into the document based on the identified parent node.

At least one other example embodiment provides a document and template creation system. According to at least this example embodiment, the document and template creation system includes a document and template creation device. The document and template creation device is configured to: identify at least one domain ontology concept based on at least a portion of a text-string input into a document; propose the at least one domain ontology concept for selection by a user; and insert at least one of the at least one domain ontology concept into the document in response to selection by the user.

According to at least some example embodiments, the text string may include at least one domain ontology concept from among a set of domain ontology concepts, and the document and template creation device may include an editor. The editor may be configured to: propose a name or label corresponding to the set of domain ontology concepts for selection by the user; and insert one or more domain ontology concepts into the document based on selection of the proposed name or label by the user.

According to at least some example embodiments, the document and template creation device may be further configured to auto-complete the text string based on the identified at least one domain ontology concept and a context of the portion of the text string in the document.

The editor may be further configured to: analyze the document to identify at least one candidate for structural content in the document; determine whether the at least one candidate exists in a library of existing domain specific structures; and insert at least one domain specific structural element from the library of existing domain specific structures into the document based on the at least one candidate if the at least one candidate exists in the library of existing domain specific structures.

Still further, the editor may be configured to: identify at least one domain ontology concept in a domain ontology database based on the candidate; and insert structural content into the document based on the identified at least one domain ontology concept.

According to at least some example embodiments, the document and template creation device may include an editor and a rules engine. The editor may be configured to: analyze the document to identify at least one candidate for structural content in the document; and determine whether the at least one candidate exists in a library of existing domain specific structures. The rules engine may be configured to identify at least one domain ontology concept in a domain ontology database based on the candidate if the at least one candidate does not exist in the library of existing domain specific structures, and insert structural content into the document based on the identified at least one domain ontology concept.

At least one other example embodiment provides a document and template creation system. The document and template creation system may include a document and template creation device. The document and template creation device may be configured to: analyze a document to identify at least one candidate for structural content; determine whether the at least one candidate exists in a library of existing domain specific structures; and insert at least one domain specific structural element from the library of existing domain specific structures into the document based on the at least one candidate if the at least one candidate exists in the library of existing domain specific structures.

The document and template creation device may include: an editor configured to: identify at least one domain ontology concept corresponding to the at least one candidate in a domain ontology database; and insert structural content into the document based on the identified at least one domain ontology concept.

According to at least some example embodiments, the document and template creation device may include: a rules engine configured to identify a parent node corresponding to the at least one candidate; and wherein the editor may be configured to insert structural content into the document based on the identified parent node.

At least one other example embodiment provides a document and template creation system. According to at least this example embodiment, the document and template creation system includes: a document and template creation device configured to: analyze a document to identify at least one candidate for structural content; identify at least one domain ontology concept corresponding to the at least one candidate in a domain ontology database; and insert structural content into the document based on the identified at least one domain ontology concept.

The document and template creation device may include: a rules engine configured to identify a parent node corresponding to the at least one candidate; and an editor configured to insert the structural content into the document based on the identified parent node.

At least one other example embodiment provides a tangible computer readable medium storing including program segments for, when executed on a computer device, causing the computer device to implement a method including: identifying at least one domain ontology concept based on at least a portion of a text-string input into a document; proposing the at least one domain ontology concept for selection by a user; and inserting at least one of the at least one domain ontology concept into the document in response to selection by the user.

At least one other example embodiment provides a tangible computer readable medium storing including program segments for, when executed on a computer device, causing the computer device to implement a method including: analyzing a document to identify at least one candidate for structural content; determining whether the at least one candidate exists in a library of existing domain specific structures; and inserting at least one domain specific structural element from the library of existing domain specific structures into the document based on the at least one candidate if the at least one candidate exists in the library of existing domain specific structures.

At least one other example embodiment provides a tangible computer readable medium storing including program segments for, when executed on a computer device, causing the computer device to implement a method including: analyzing a document to identify at least one candidate for structural content; identifying at least one domain ontology concept corresponding to the at least one candidate in a domain ontology database; and inserting structural content into the document based on the identified at least one domain ontology concept.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting, and wherein:

FIG. 3 illustrates an example of a relatively generic template for a clinical indication relating to a CT scan of the abdomen and pelvis with and without contrast.

FIG. 4 illustrates the document of FIG. 3, which has been partly modified by an editor according to an example embodiment.

FIG. 5 shows a document similar to that shown in FIG. 4, except that the document has been modified to include the clinical indication header "Pancreatitis" in the free form "CLINICAL INDICATION" header section.

FIG. 7 shows an example in which section 407 has been modified to further include additional text.

FIG. 8 shows a document similar to that shown in FIG. 7, except that the user field 410 has been expanded to include additional text.

FIG. 9 shows an example in which the user has changed the default value of the contrast material.

FIG. 10 shows a final patient report of the clinical indication.

FIG. 11 illustrates a "CT PANCREATITIS" template generated in accordance with at least some example embodiments.

FIG. 16 illustrates a "CT PANCREATITIS" template generated in accordance with at least some example embodiments.

Figure 1:
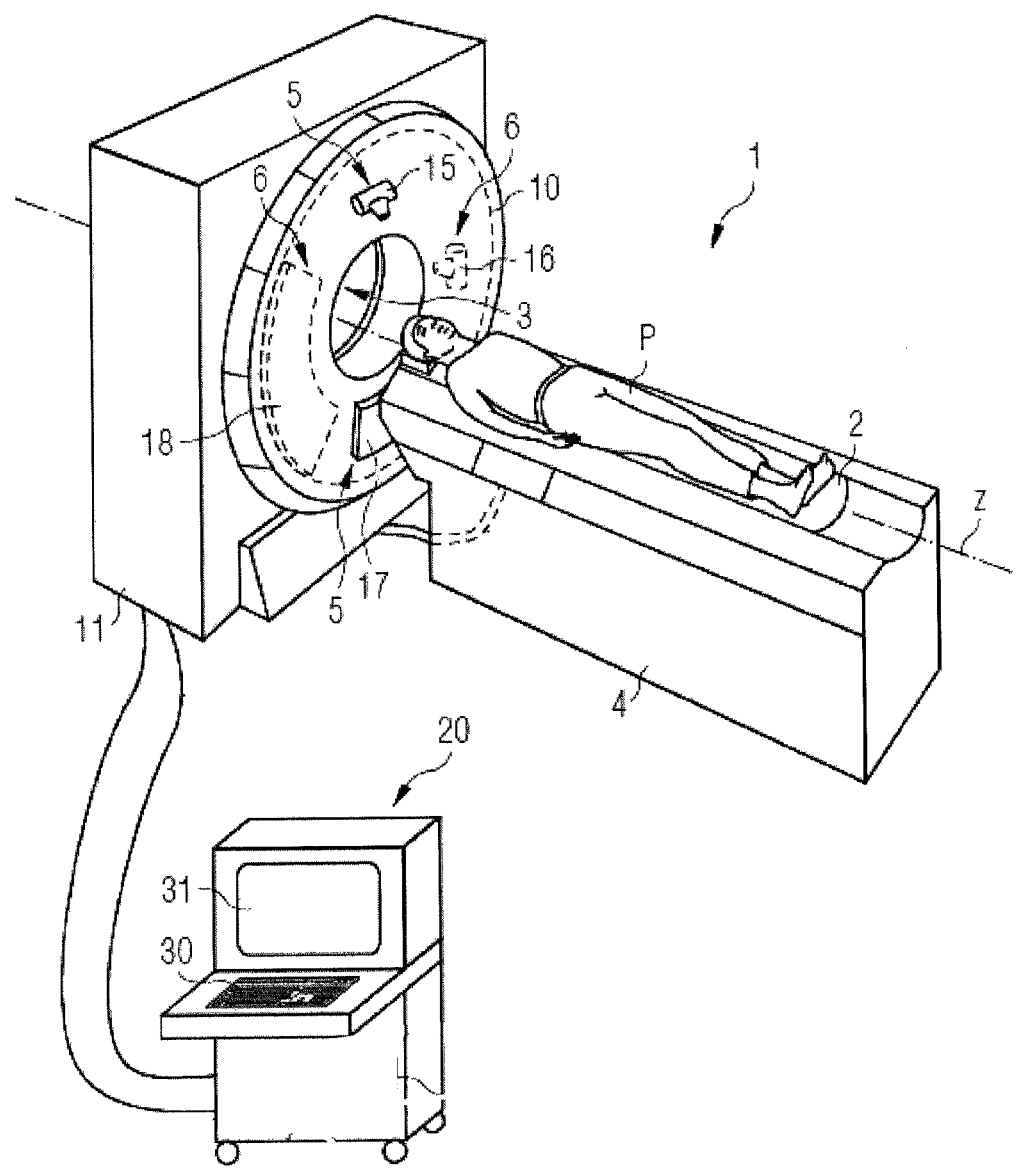
FIG. 1 shows a schematic diagram of a computed tomography system.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a selfconsistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

At least some example embodiments may simplify the creation and/or modification of templates using, for example, a word processing editor as the template editor. At least some example embodiments enable users to create and/or change documents and/or templates arbitrarily while the system also inconspicuously supports creation of structured templates. When a user saves a document as a template, the changes to the original template are analyzed, and a new template is derived based on the changes to the original template. The new template is then presented to the user for validation.

At least some example embodiments will be discussed in the context of clinical indications, such as radiology reports. However, it should be understood that example embodiments are applicable to various medical and non-medical documents and fields of technology.

Example embodiments support a library of domain specific structural elements (e.g., given and/or pre-defined domain specific structural elements). Users are supported (e.g., implicitly supported) by an ontology based auto completion feature as well as a rules engine that determines candidates for structural content.

As is known, an ontology is a set of concepts with attributes and relationships between the concepts having various meanings. The set of concepts define a domain of knowledge. An ontology is normally expressed in a format that is machine-readable; that is, readable by a computer or other processing device.

Certain example applications of ontologies are artificial intelligence or biomedical informatics. In these examples, ontologies are used to define a domain of knowledge through terms and relationships as the end goal, rather than being used for tagging. In the area of taxonomies and information science, an ontology may be considered as a more complex type of thesaurus, in which there are various customized relationship pairs that contain specific meanings, such as "owns" and a reciprocal "is owned by," rather than simply "related term" relationships.

FIG. 1 shows a schematic diagram of a computed tomography system 1. The CT system 1 includes a dual source scanner 11, in which two data acquisition systems 5, 6 travel around a measurement chamber 3 on a gantry 10. Each data acquisition system 5, 6 has an X-ray source 15, 16 with a detector 17, 18 opposite each X-ray source 15, 16.

In front of the scanner 11 is a patient support facility or patient table 4. The upper part 2 of the patient table 4 may be displaced with an examination object P positioned thereon. In the example shown in FIG. 1, the upper part 2 may be displaced relative to the scanner 11 along the z-direction, which corresponds to the system axis z longitudinally through the measurement chamber 3, so that the patient P is moved through the measurement chamber 3 relative to the data acquisition system 5, 6. The scanner 11 and patient table 4 are activated by a control facility 20, from which control data for table positioning and control data for the data acquisition systems 5, 6 is output to activate the CT system 1. In this example, the control device 20 is in the form of a computer or other processing device having a display 31, and one or more input devices (e.g., a keyboard, mouse, etc.) 30.

In example operation, the patient is moved along the z-axis while the X-ray sources 15, 16 travel around the patient at the same time, so that a helical path results for the X-ray sources 15, 16 relative to the patient P during the measurement. Image data records and then images are then generated based on the measurements.

In the dual source scanner 11 shown in FIG. 1, the two X-ray sources 15, 16 operate with different X-ray tube voltages and emit X-ray radiation of different energy. However, it should be noted that instead of the system shown in FIG. 1, any other computed tomography system may be used in connection with example embodiments discussed herein. For example, example embodiments may be applicable to scanners with just one data acquisition system.

Figure 2:
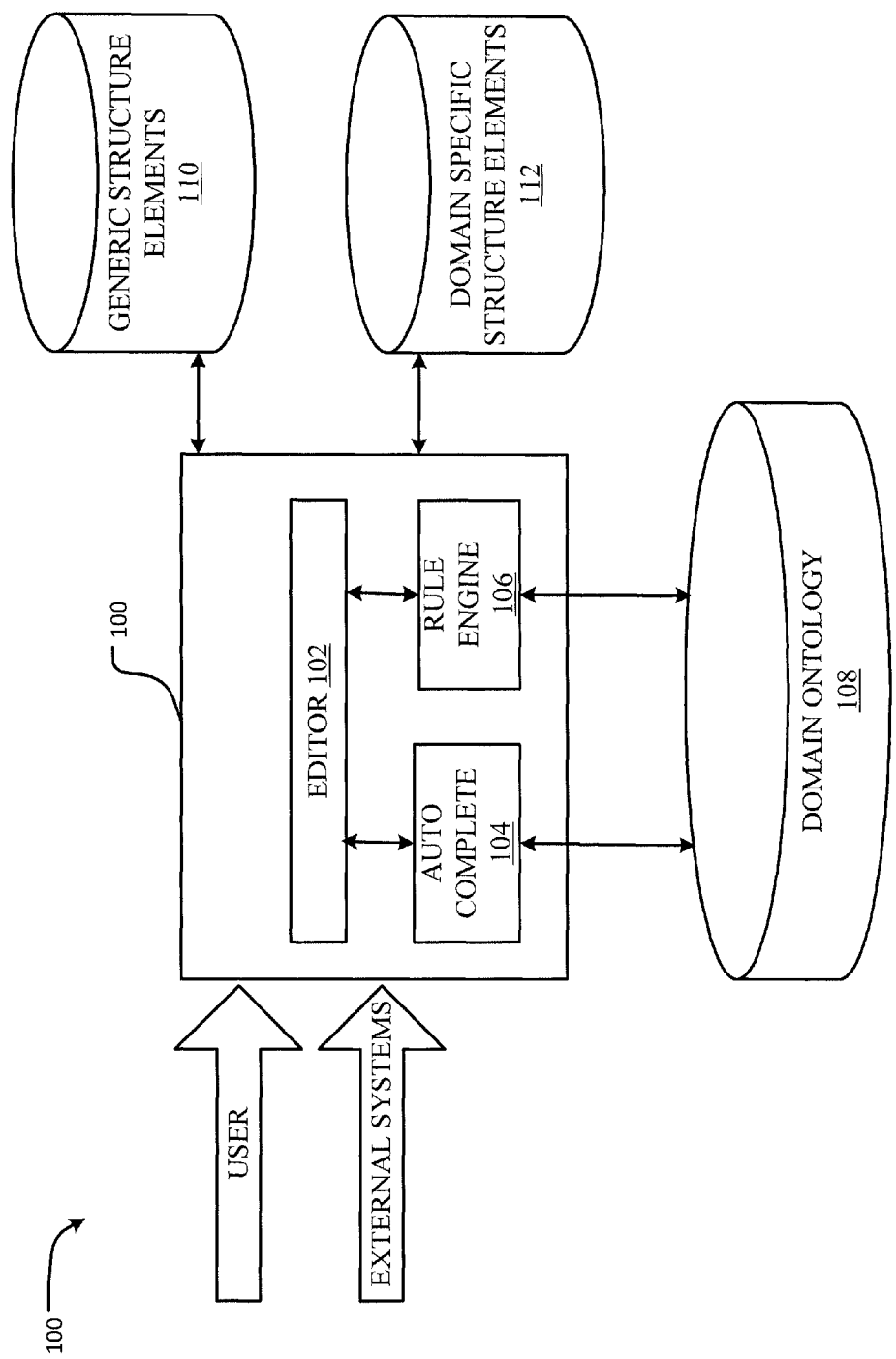
FIG. 2 is a block diagram illustrating a document and template creation system according to an example embodiment.

FIG. 2 is a block diagram illustrating an example embodiment of a document and template creation system 10. The document and template creation system 10 supports an auto complete functionality based on one or more underlying domain ontologies.

Referring to FIG. 2, the document and template creation system 10 includes a document and template creation device 100. The document and template creation device 100 may be implemented on a computer or other processing device. In one example, the document and template creation device may be implemented on the control device 20 shown in FIG. 1.

The document and template creation device 100 includes an editor 102 that is communicatively coupled to an auto complete engine 104 and a rules engine 106. In one example, the editor 102 may be implemented in the form of a word processor running on the document and template creation device 100.

According to at least one example embodiment, the document and template creation device 100 is configured to: identify at least one domain ontology concept based on at least a portion of a text-string input into a document; propose the at least one domain ontology concept for selection by the user; and insert at least one of the at least one domain ontology concept into the document in response to selection by the user.

In at least one other example embodiment, the document and template creation device 100 is configured to create a template. In this example embodiment, the document and template creation device 100 is configured to: analyze a document to identify at least one candidate for structural content; determine whether the at least one candidate exists in a library of existing domain specific structures; and insert at least one domain specific structural element from the library of existing domain specific structures into the document based on the at least one candidate if the at least one candidate exists in a library of existing domain specific structures.

In yet another example embodiment, the document and template creation device 100 is configured to: analyze a document to identify at least one candidate for structural content; identify at least one domain ontology concept corresponding to the candidate in a domain ontology database; and insert structural content into the document based on the identified domain ontology concept.

Referring back to FIG. 2, the document and template creation device 100 is communicatively coupled to a domain ontology database 108, a generic structural elements database 110 and a domain specific structural elements database 112.

Each of the domain ontology database 108, the generic structural elements database 110, and the domain specific structural elements database 112 may be implemented on one or more servers or in a cloud computing system so as to be accessible through one or more wired or wireless packet or circuit switched networks.

Each of the domain ontology database 108, the generic structural elements database 110, and the domain specific structural elements database 112 serves as a source for creating structural content within a template and/or document created using the document and template creation system 10.

Still referring to FIG. 2, the generic structural elements database 110 includes a library of standard structural elements, which are provided by the editor (e.g., placeholders/fields, tables, section headers, etc.).

The domain ontology database 108 stores one or more domain ontologies (e.g., based on controlled vocabularies and thesauri), which are used to derive structural content from unstructured free text (e.g., "narratives").

The domain specific structural elements database 112 includes a library of specific structural elements, which may be domain specific or specific to the organization using the system.

In the example shown in FIG. 2, the auto complete engine 104 and the rules engine 106 are implemented on the same computer (e.g., the document and template creation device 100) as the editor 102. In alternative example embodiments, however, the auto complete engine 104 and/or the rules engine 106 may be implemented on one or more separate computers and the editor 102 may be communicatively coupled to the auto complete engine 104 and/or the rules engine 106 via one or more wired or wireless packet and/or circuit switched networks.

After a patient undergoes a computed tomography (CT) or other medical imaging scan, the radiologist (hereinafter "user") reviews and studies the resultant images. In one example, if the patient has had previous scans, then the radiologist compares the current scan with the previous scan or scans. The radiologist reviews and studies the scan for anomalies (e.g., polyps, lesions, etc.) within the scanned portion of the patient's body.

After studying the scan(s), the user creates a radiology report using a document and template creation device such as the document and template creation device 100 shown in FIG. 2.

In creating the report, the user first selects or opens a template using the editor 102.

FIG. 3 illustrates an example of a relatively generic template for a clinical indication relating to a CT scan of the abdomen and pelvis with and without contrast. For the sake of clarity, the page header containing, for example, hospital name, address and logo, department and physician names, and page footer are omitted. In this example, square brackets "[ ]" mark fields, which are discussed in more detail later.

Referring to FIG. 3, the clinical indication includes various free form sections 407, 409, 411, 412, 414 and 416 in which the user may input text (e.g., narratives) into the document. These free form sections may also include default text. For example, as shown in FIG. 3, the "ABDOMEN" section 414 and the "PELVIS" section 416 are each populated with default text, which is editable by the user.

More specifically, the "ABDOMEN" section 414 includes the following text:

The liver, spleen, kidneys, pancreas, gallbladder and adrenal glands grossly within normal limits. No obstruction of bowel. No free intraperitoneal air.

And, the "PELVIS" section 416 includes the following text:

The bladder and pelvic viscera are grossly normal. There is no free fluid, lymphadenopathy or suspicious osseous lesions.

Still referring to FIG. 3, the "IMPRESSION" section 411 is also free form, allowing the user to enter his/her impression based on the studied scan(s).

In addition to the free-form sections 407, 409, 411, 412, 414 and 416 denoted in FIG. 3, the user may also enter text into any portion of the template as desired so as to, for example, create new sections in the document.

The clinical indication also includes various structural elements 402, 404, 406, 408 and 410. Some examples of structural elements include: sections and section headers; placeholders and fields; pick lists and pick boxes; concept names and relations; and tables. Each of these examples will be discussed in more detail below.

Section headers provide an overall structure to the document. In some cases, sections may be nested. Section headers may increase readability, for example, by collapsing and/or expanding the corresponding sections, but also for fast navigation (e.g., by speech command, displaying the section headers in a separate navigation pane, etc.), or to provide context for speech recognition or natural language processing (NLP) subsystems.

In the example shown in FIG. 3, section headers include: "CLINICAL INDICATION", "COMPARISON", "TECHNIQUE", "FINDINGS", "ABDOMEN", "PELVIS", and "IMPRESSION". The example shown in FIG. 3 also includes a sub-section header "CT radiation dose", which is nested within the "TECHNIQUE" section. These sections are present in the original template selected by the user. However, these sections may be modified by the user as desired using the editor 102.

Still referring to FIG. 3, the clinical indication shown in FIG. 4 also includes several fields 402, 404, 406, 408 and 410. Fields include two basic types: "user fields" and "system fields." User fields are filled by the user, whereas "system fields" are filled automatically when a document is opened and/or when the content defined by the field becomes available to the system. Fields optionally have a name or identifier, a list of allowed values (defined, e.g., as a pick list, a list of radio buttons or check boxes, a range of integer values, etc.), and a default value.

Pick lists or pick boxes allow a user to select one or more choices (options) from a list. A concrete implementation is a combo box, a drop down list, a set of radio buttons, a list of terms included in square brackets and separated by "|", etc. Pick lists may have default values (e.g., denoted in bold-type), and selection of an option in the pick list may automatically trigger actions (e.g., substituting the pick list with a longer text fragment or text macro representing the selection). Pick boxes allow a user to select from multiple pick lists at the same time.

In the example shown in FIG. 3, fields 402, 404, 406 and 408 are system fields, whereas field 410 is a user field.

Each of the system fields 402, 404, 406 and 408 are filled by the system 10 based on known information about the patient and/or current scan. For example, the system 10 automatically fills field 402 with the age of the patient. The system automatically fills field 404 with the patient's sex. The system automatically fills field 406 with an indication of whether the current scan is being compared with previous scans (and if so, the dates of the previous scans), and the system automatically fills field 408 with the CT radiation dose for the current scan.

Although FIG. 3 shows only a few system fields, example embodiments may include any number of system fields that are at least initially filled by the system (e.g., patient's height, weight, etc.).

Still referring to FIG. 3, as mentioned above, field 410 is a user field. The user field 410 includes a pick list regarding the CT technique used during the scan ([3 mm spiral|5 mm spiral]).

In a structural element such as a table, columns typically represent concepts that belong together (e.g., last name, first name, postal code, city, state, street, phone number, etc.) and each row represents one instance of these concepts. Cells may be implemented as fields (e.g., a 5 digit numerical field) or pick lists (e.g., all states in the United States).

As mentioned above, after opening a template, the user may modify and/or customize the document as desired using the editor 102. In one example, the user customizes the document by entering one or more text strings into the document. In another example, the user may customize the selected document by modifying existing text (e.g., the default text in the "ABDOMEN" and/or "PELVIS" sections).

When presented with a user field, such as a pick list, the user may select one of the options of the pick list by clicking on the desired options with a mouse or other input device.

FIG. 4 illustrates the document of FIG. 3, which has been partly modified by the editor 102.

As shown in FIG. 4, the system fields 402, 404, 406 and 408 have been automatically filled with the patient's age ("75"), the patient's sex ("male"), whether the current scan is being compared with other previous scans ("None"), and the CT radiation dose ("14,1"), respectively.

FIG. 5 shows a document similar to that shown in FIG. 4, except that the user has modified the document to include the clinical indication header "Pancreatitis" in the free form "CLINICAL INDICATION" header section 412. This text (as well as any text) may be entered into the document using any suitable input device (e.g., by typing the text, using known speech recognition software, etc.). In another example, the user may select text passages for insertion from a macro library.

According to at least some example embodiments, the document and template creation system 10 utilizes an auto complete mechanism to suggest concept names from underlying domain ontologies, for example, stored at the domain ontology database 108. The document and template creation system 10 may prefer concept names from ontologies over other lexicon entries. In so doing, the document and template creation system 10 shown in FIG. 2 suggests concept names to be entered into the document on-the-fly as the user enters a text string.

At least one example embodiment provides a method including: identifying at least one domain ontology concept based on at least a portion of a text-string input into the document; proposing the at least one domain ontology concept for selection by the user; and inserting at least one of the at least one domain ontology concept into the document in response to selection by the user. This method may be implemented by the document and template creation device 100 shown in FIG. 2.

Figure 6:
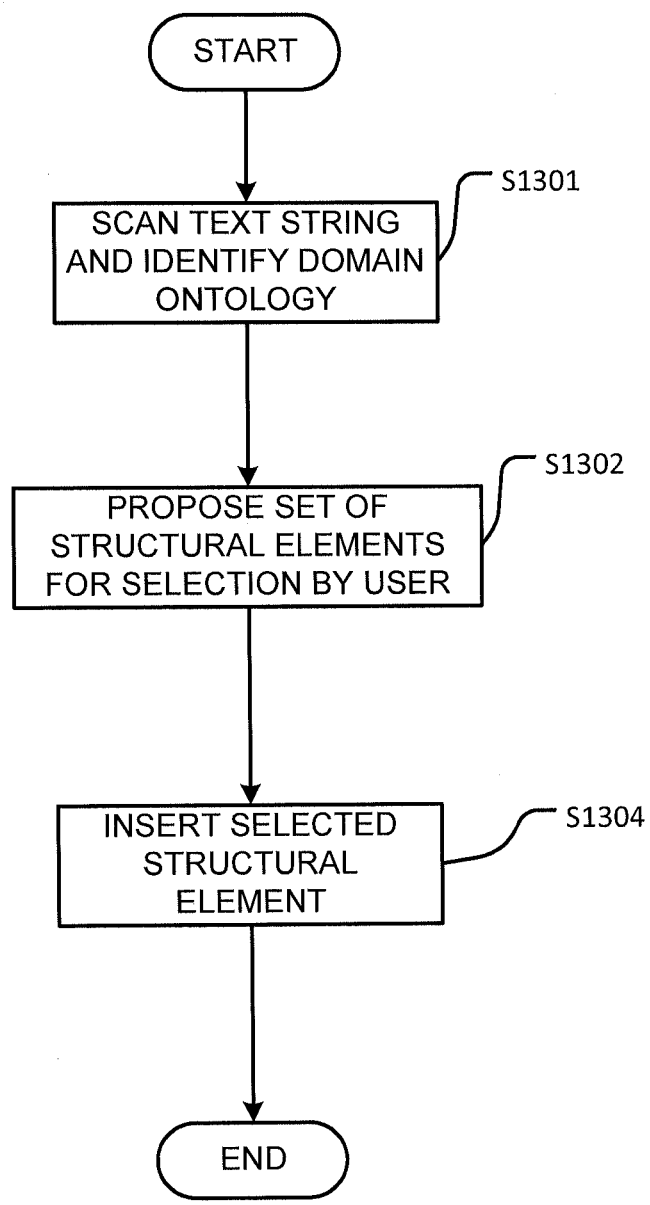
FIG. 6 is a flow chart illustrating a method according to an example embodiment.

FIG. 6 is a flow chart illustrating a method according to an example embodiment. The method shown in FIG. 6 may be implemented by the document and template creation device 100 shown in FIG. 2, and will be described as such for example purposes. The example embodiment shown in FIG. 6 will also be described with regard to an example in which the clinical indication header "Pancreatitis" is entered into the document shown in FIG. 6.

Referring to FIG. 6, as the user inputs a text string into a free-form field of the document, at step S1301 the auto complete engine 104 analyzes (e.g., in real-time or on-the-fly) the text string to determine whether the text string corresponds to known structural content associated with a particular domain ontology. In one example, the editor 102 accesses the auto complete engine 104, which attempts to identify a domain ontology at the domain ontology database 108 based on the text-string input by the user.

For example, if the user begins typing "Pancr" into field 412 shown in FIG. 5, then the auto complete engine 104 searches the domain ontology database 108 for one or more domain ontology concepts including the text string "Pancr". In more detail, the editor 102 requests that the auto complete engine 104 obtain auto complete suggestions (e.g., domain ontology concepts) from the domain ontology database 108. In response to the request from the editor 102, the auto complete engine 104 accesses and searches the domain ontology database 108 for one or more domain ontology concepts including and/or associated with the text string "Pancr".

After identifying one or more domain ontology concepts including and/or associated with the text string entered by the user, the auto complete engine 104 passes the identified domain ontology concepts to the editor 102. The editor 102 then proposes the obtained domain ontology concepts (e.g., in a pop-up box) on a display (e.g., display 31 in FIG. 1) for selection by the user at step S1302.

In one example, the auto complete module 104 obtains "Pancreatitis", "Pancreatic cancer" and "Pancreas" from the domain ontology database 108 as auto complete suggestions for the text string "Pancr".

In this example "Pancreatitis" has SNOMED ID 75694006, "Pancreatic cancer" is listed as a synonym for "malignant tumor of pancreas" with SNOMED ID 363418001 and "Pancreas" with SNOMED ID 181277001, and also, for example, RadLex ID RID170. Even though "Pancreas" is more often used in radiology reports than "Pancreatic cancer" and "malignant tumor of pancreas," and is present in more of the underlying ontologies, it is a less likely candidate in the context of a clinical indication. With knowledge of the relative likelihood of the candidates, which is known by the system, the editor 102 may display the auto complete suggestions in order of the likelihood that they are to be used in the relevant document (e.g., a clinical indication). In this example, because the term "Pancreas" is less likely to be used in a clinical indication, the term may be displayed as the last option in the list of candidates presented to the user.

Still referring to FIG. 6, at step S1304 the editor 102 enters one of the proposed domain ontology concepts into the "CLINICAL INDICATION" header section 412 in response to selection of the displayed domain ontology concept by the user. FIG. 5 shows an example in which "Pancreatitis" is selected by the user using the editor 102.

In another example, if the user enters the text "necrotizing inf", the document and template creation system 10 may suggest "necrotizing inflammation" (SNOMED ID 31980008), "acute necrotizing inflammation" (SNOMED ID 71877001), "chronic necrotizing inflammation" (SNOMED ID 37585003), "fibrinoid necrotizing inflammation" (SNOMED ID 88430000), and "necrotizing granulomatous inflammation" (SNOMED ID 27058005), rather than only "necrotizing information". In this example, natural language processing (NLP) methods are used to identify context information (e.g., the word "necrotizing" in the above-discussed example), rather than solely analyzing the word currently being input by the user. Because NLP methods are generally known, a detailed discussion is omitted.

FIG. 7 shows an example in which section 407 has been modified to further include the text: "characteristic of acute pancreatitis with lipase 2 times the upper limit of normal." This text may be entered by the user.

According to at least some example embodiments, selection of a pick list by a user may cause the editor 102 to insert a text string into the document.

FIG. 8 shows a document similar to that shown in FIG. 7, except that the user field 410 has been expanded to include the following text in response to the user's selection of the 3 mm spiral technique from the pick list.

3 mm spiral images were obtained from the diaphragm through the iliac crests before and after IV administration of [150] ml low osmolar contrast material (300 mgI/ml). The images were obtained during the arterial phase of contrast-enhancement.

The user may select one of the two options in a pick list by clicking the appropriate text with a mouse, selecting the text on a touchscreen, using voice commands (e.g., "next field" followed by "3 mm spiral"), by hovering over the selected text if an eye tracking system is installed, etc.

Still referring to FIG. 8, in this example the pick list is replaced with the text macro having the label "3 mm spiral". As shown, this macro contains another user field 410b. The user field 410b designates the amount of contrast material administered to the patient during the scan. In this example, the user field 410b is initially set to a default value (150 ml), and is typeset in bold face to indicate that it is a default value.

The user may change the default value for the contrast material in field 410b in the same manner as discussed above with regard to other user fields in the document. FIG. 9 shows an example in which the user has changed the value of the contrast material 170.

FIG. 10 shows a final patient report of the clinical indication. In FIG. 10, both the findings and the impression section for the current patient are completed.

In the document shown in FIG. 10, the user has added text to the "ABDOMEN" section 414. In this example, the user has entered the following text into the "ABDOMEN" section 414 in the same manner as described above.

The pancreas is moderately enlarged. There are marked inflammatory changes surrounding the head and uncinate process of the pancreas, consistent with acute pancreatitis.

The user has also modified the "IMPRESSION" section 411 to include the text "Acute Pancreatitis" reflecting the user's impression of the scan(s).

According to at least some example embodiments, the auto complete engine 104 may also propose child (or sibling) concepts and/or nodes corresponding to the suggested concepts and/or nodes as possible options for selection by the user.

Similarly, if the user first defines elements of a pick list (e.g., in free text) using the editor 102, then the auto completion engine 104 may obtain the underlying domain ontology from the domain ontology database 108 based on the defined elements of the pick list. The auto complete engine 104 passes the obtained underlying ontology concept to the editor 102, and the editor 102 then proposes the name or label for the pick list element in a pop-up box requesting that the user click "YES" or "NO" to accept or reject the proposed name or label.

In this example, the editor 102 suggests the use of ontology concepts. If the user selects an ontology concept as an element, the system allows for selecting alternative pick list choices among the "siblings" of the obtained ontology concept. Additionally, "parent" concept(s) may be proposed as the name and/or label of the pick list.

The method described above with regard to FIG. 6 may also be used when the user enters, for example, section headers, column headers of a table, or into the document, rather than entering a text string into a free-form section of the document.

According to at least some example embodiments, when the user enters free text into the editor 102, the auto complete engine 104 looks up the underlying domain ontology and proposes concepts and/or nodes to the user. The user may accept the suggested concepts and/or nodes to be inserted into the document. Concept names serve as annotations of the document (to be used, e.g., by semantic search engines). In addition, each concept and/or node may become a candidate for a pick list.

After completing the radiology report for the patient, the user saves (and in some systems "signs off" or electronically signs) the report.

After having created a document (e.g., as shown in FIG. 10), the user may decide to create a new template based on the created document. In the above-discussed example, the user may desire to create a template referred to as "CT PANCREATITIS". In response to initiation of this functionality (e.g., by the user), the document and template creation system 10 creates and stores a new template for future use.

At least one example embodiment provides a method for creating a template. In this example embodiment, the method includes: analyzing a document to identify at least one candidate for structural content; determining whether the at least one candidate exists in a library of existing domain specific structures; and inserting at least one domain specific structural element from the library of existing domain specific structures into the document based on the at least one candidate if the at least one candidate exists in a library of existing domain specific structures.

At least one other example embodiment provides a method for creating a template. In this example, the method includes: analyzing a document to identify at least one candidate for structural content; identifying at least one domain ontology concept corresponding to the candidate in a domain ontology database; and inserting structural content into the document based on the identified domain ontology concept.

Methods for creating templates according to at least some example embodiments will be described, at least in some cases, with regard to the documents shown in FIGS. 10-16.

FIG. 10 is described above, and thus, the description of FIG. 10 will not be repeated here.

FIG. 11 illustrates an initial template created based on the document shown in FIG. 10. As shown in FIG. 11, if the user creates a new template: (i) all system fields are reset; and (ii) all changed user fields and pick lists are presented for review together with the newly identified candidates for fields and pick lists. The newly identified candidates are identified in this example by dotted outlines.

Initially, the document and template creation system 100 analyzes the text of the document shown in FIG. 10 to identify text input by the user as candidates for structural content (e.g., candidates for insertion of section headers, pick lists, fields, etc.). When analyzing the document, the editor 102 may identify text input into the document by the user as candidates for structural content based on, for example, format and/or content of the text. As discussed herein, candidate text may be referred to as candidate for structural content, or in some cases merely candidate.

In one example, the editor 102 analyzes text strings input into the document by the user, and identifies text strings as candidate sections and subsections. The editor 102 may identify relatively short text strings, which are aligned to the left, and followed by a colon sign and an empty line as candidate sections and/or subsections.

Referring again to the example shown in FIG. 10, "CLINICAL INDICATION", "TECHNIQUE", "CT radiation dose", "FINDINGS", "ABDOMEN", "PELVIS" and "IMPRESSION" are already section (or subsection) headers in the template, and thus, need not be identified as candidates for section or subsection headers. However, any newly entered text strings meeting the above-mentioned criteria may be identified as a candidate for classification and insertion as a section or subsection header in the new template. Another example text string that may constitute a candidate section header is "RECOMMENDATION".

Figure 12:
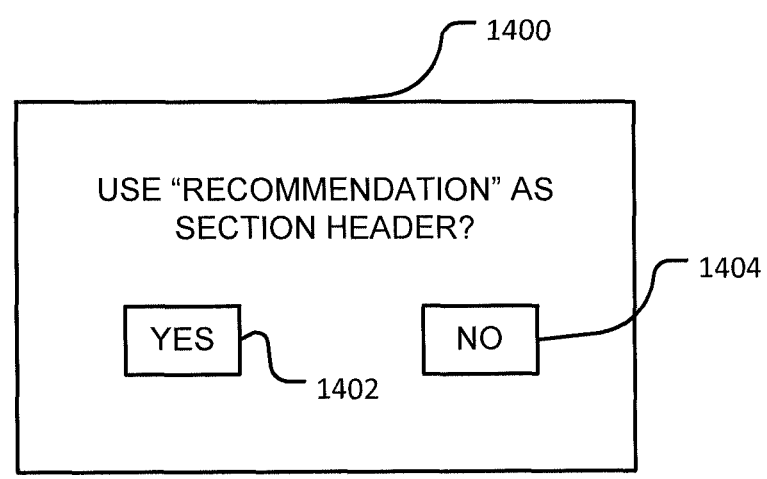
FIG. 12 shows an example of a pop-up box according to an example embodiment.

For each text string meeting the above-mentioned criteria, the editor 102 asks the user whether the text string is a section (or subsection) header. In one example, if the user enters "RECOMMENDATION:" (e.g., using the method for creating a document discussed herein), then the editor 102 may identify the text string as a section header candidate. Once having identified the text string as a section header candidate, the editor 102 displays, for example, a pop-up box to the user asking the user to accept or reject "RECOMMENDATION" as a section header. If the user accepts the text string as a section header, then "RECOMMENDATION" is inserted as a section header in the new template. FIG. 12 shows an example of the above-discussed pop-up box.

Referring to FIG. 12, the pop-up box 1400 is displayed on a screen (e.g., display 31 in FIG. 1), and includes a "YES" button 1402 and a "NO" button 1404 for selection by the user. Pop-up boxes such as that shown in FIG. 12 are generally known, and thus, a more detailed discussion is omitted.

When analyzing the document to create a new template, the editor 102 also identifies text strings as candidate fields in the document based on the content and/or format of the text input into the document by the user. In one example, the editor 102 may identify each set of numerical digits input into the document as a candidate field. For each of the candidate fields, the editor 102 presents the user with a short dialog window or pop-up box.

Figure 13:
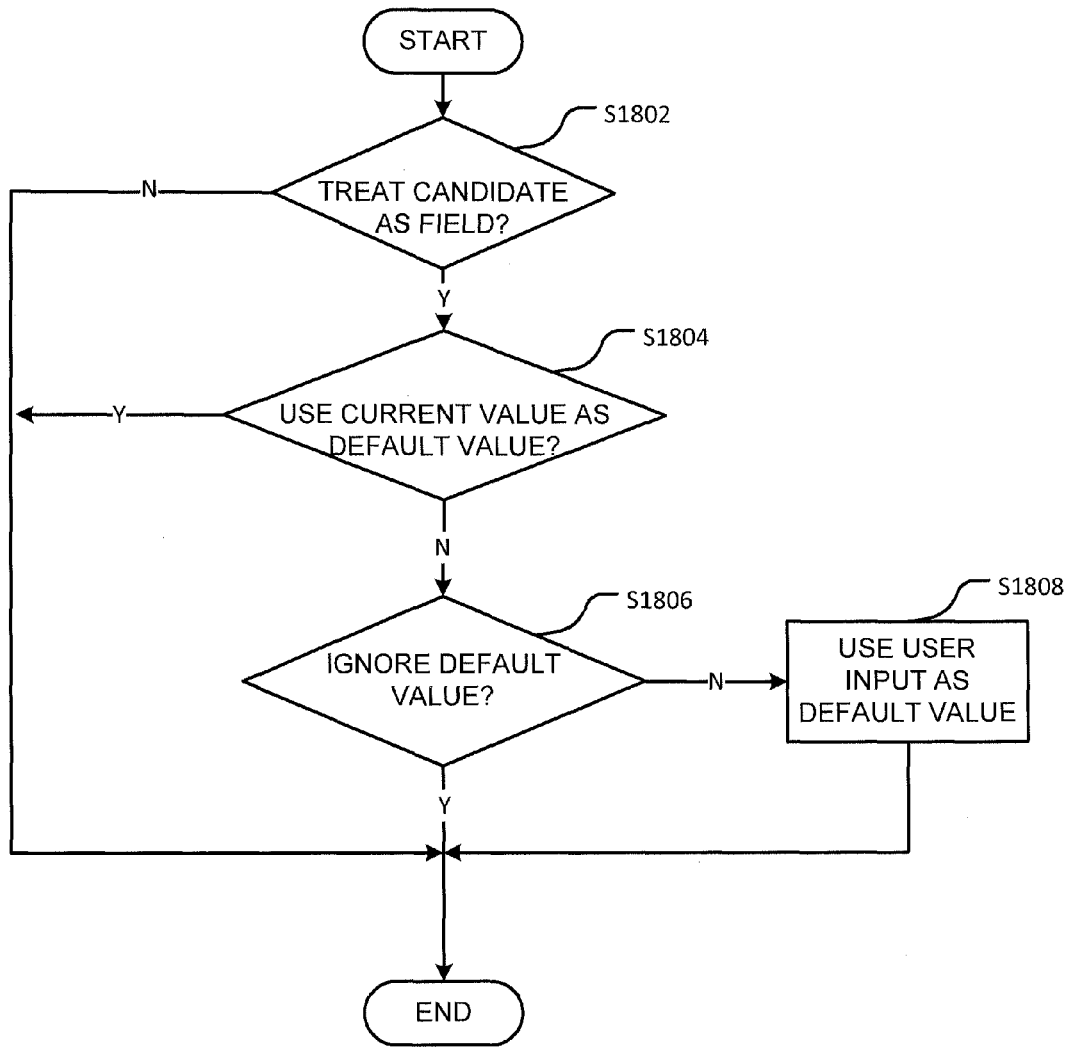
FIG. 13 is a flow chart illustrating a method for creating one or more fields in a template according to an example embodiment.

FIG. 13 is a flow chart illustrating a method for creating one or more fields in a template according to an example embodiment. The method shown in FIG. 13 will be described with regard to the number "2" input into the clinical indication shown in FIG. 11. However, it should be understood that the method shown in FIG. 13 may apply to numerical fields as well as text fields. In this case, the default value may refer to a numerical value as well as default text.

Referring to FIGS. 11 and 13, after the editor 102 identifies the number "2" as a candidate for a new numerical field, at step S1802 the editor 102 determines whether the candidate should be treated as a field in the new template. For example, after identifying the number "2" as a candidate, the editor 102 presents the user with a pop-up box for the candidate field asking the user whether the candidate is to be treated as a field in the new template.

The editor 102 may display a pop-up box enabling the user to "ignore" or "accept" the candidate as a numerical field. The editor 102 then determines whether the number is to be treated as a field based on input from the user.

Figure 14A:
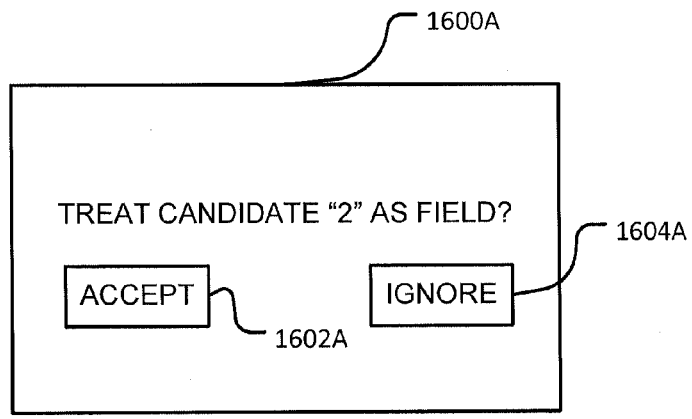
FIGS. 14A-14C show examples of pop-up boxes according to other example embodiments.

FIG. 14A shows an example of the pop-up box described above with regard to step S1802 shown in FIG. 13.

Referring to FIG. 14A, the pop-up box 1600A asks the user whether the candidate "2" should be treated as a field in the new template. The pop-up box 1600A includes an "ACCEPT" button 1602A and an "IGNORE" button 1604A for selection by the user.

As discussed in more detail below, if the user accepts the number as a field, then the user is asked whether: (i) the entered value should be used as default value in the template; (ii) there is another default value; or (iii) if there is no default value.

Returning to FIG. 13, if the user clicks the "IGNORE" button 1604A, then the candidate "2" is not treated as a field in the new template and the process terminates.

If the user clicks the "ACCEPT" button 1602A, then the candidate "2" is treated as a field in the new template, and the editor 102 determines whether the current value "2" is to be used as the default value in the new template based on user input at S1804. In one example, the editor 102 may display the pop-up box 1600B shown in FIG. 14B.

Figure 14B:
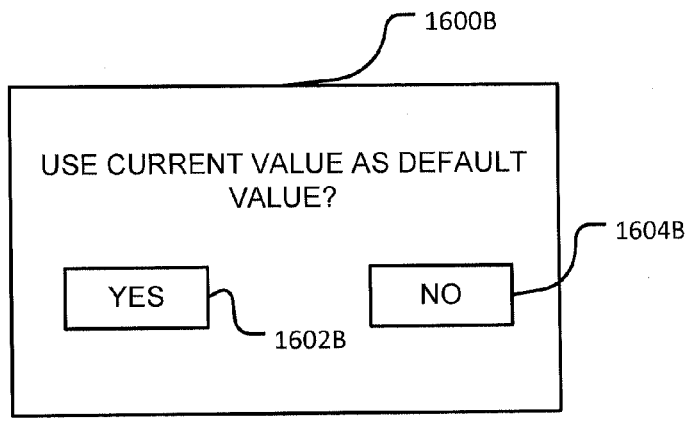

FIG. 14B shows an example of a pop-up box described with regard to step S1804 in FIG. 13.

Referring to FIG. 14B, the pop-up box 1600B asks the user whether the current value "2" should be used as the default value.

If the user clicks the "YES" button 1602B, then the current value "2" is used as the default value and the process terminates.

Returning to FIG. 13, if the user clicks the "NO" button 1604B, then the editor 102 determines whether to ignore the default value based on user input at S1806. In one example, at S1806, the editor 102 displays the pop-up box 1600C shown in FIG. 14C to the user.

Figure 14C:
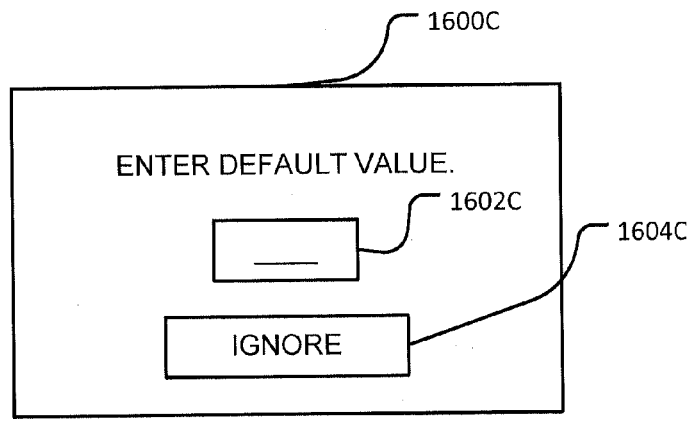

FIG. 14C shows an example of the pop-up box described above with regard to step S1806.

Referring to FIG. 14C, the pop-up box 1600C asks the user to enter an alternative default value, or to ignore the request for a default value. As shown, the pop-up box 1600C includes a data entry field 1602C and an "IGNORE" button 1604C.

If the user clicks the "IGNORE" button at step S1806, then the editor 102 determines that the new field in the template will not have a default value and the process terminates. Otherwise, the users enters a default value into the data entry field 1602C, and the editor 102 uses the user input as the default value for the new field at S1808.

While scanning a document, the editor 102 also analyzes text strings to determine whether a particular text string is a candidate to be replaced with other structural content, such as a pick list.

As mentioned above, an example of structural content includes concept names and/or relations. Various methods of "natural language processing" (NLP) allow extraction of ontology concepts and/or relations from narratives and/or free text input into the document by the user. According to at least some example embodiments, NLP is used to identify candidates in narratives of a document that may serve as structural content. For example, if an ontology concept is encountered that is already used in some existing domain specific structural element (e.g., as an option in a pick list), then the corresponding domain specific structural element may be proposed to replace the identified concept when creating a template from a document.

If the document was created using the editor 102, then the document may be at least partially annotated with basic annotations from the auto complete function 104 and/or because the document is an edited version of some existing template that already contains structural content.

If the document was, for example, pasted into the editor 102 from some external editor, then the document may not include any annotations. In either case, once the user decides to create a new template, standard NLP methods are used to identify (further) ontology concepts.

Figure 15:
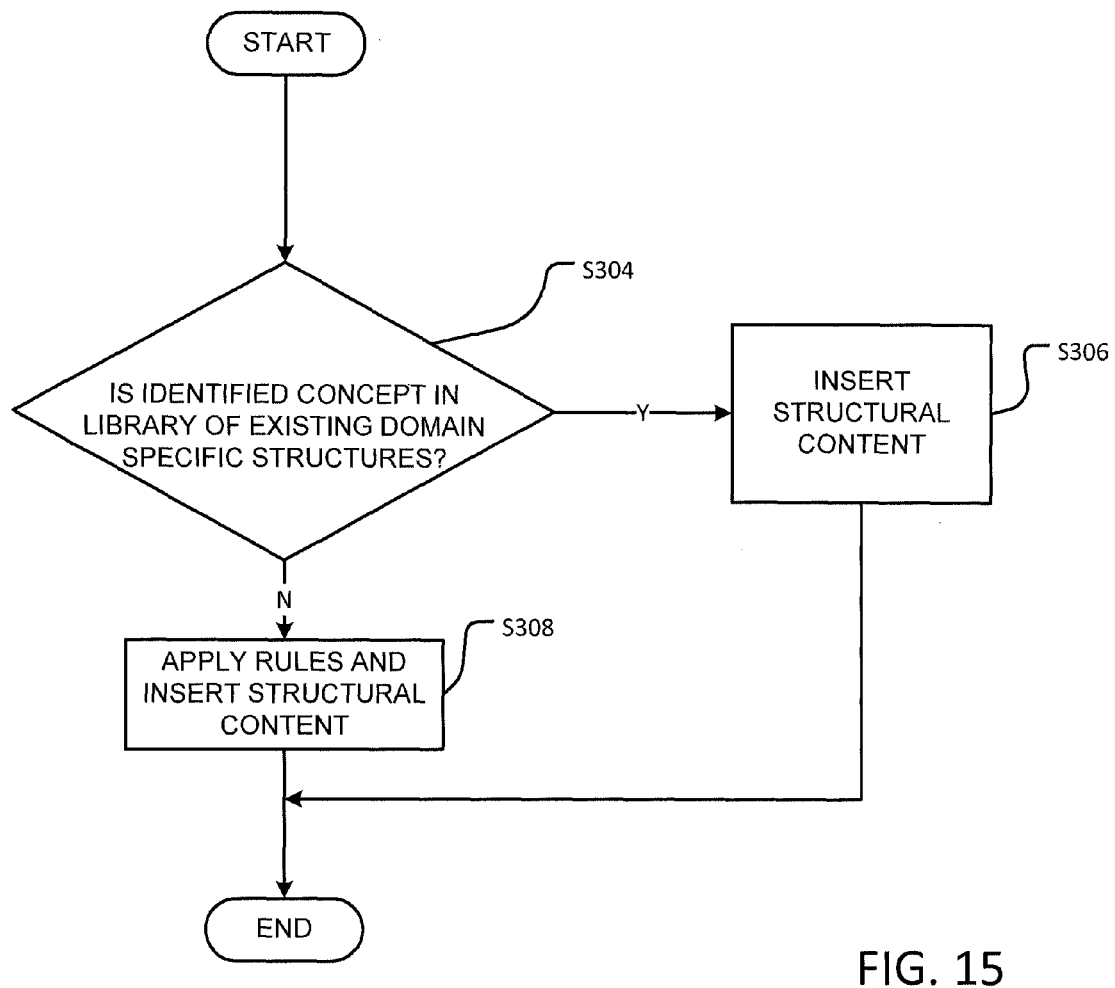
FIG. 15 is a flow chart illustrating a method for creating structural content in a template according to an example embodiment.

FIG. 15 is a flow chart illustrating a method for creating/inserting structural content in a template according to an example embodiment. The method shown in FIG. 15 will be described as being performed by the system shown in FIG. 1.

After having provided a more generic discussion of FIG. 15, various more specific examples will be described.

Referring to FIG. 15, when the editor 102 identifies a text string in the document as a candidate for structural content in the new template (e.g., as an ontology concept and/or relation from narratives and/or free text), at step S304 the editor 102 determines whether the identified candidate exists in the library of existing domain specific structures stored at the domain specific structural elements database 112. As discussed herein, an example of a domain specific structural element is a pick list or pick box.

If the identified candidate exists in the library of existing domain specific structures, then the identified concept is part of (at least) one domain specific structure (e.g., a pick list). In this case, the editor 102 obtains the corresponding one or more domain specific structural element associated with the candidate, and proposes the obtained domain specific structural element(s) for selection by the user. In one example, the editor 102 presents the corresponding domain specific structural element(s) to the user by displaying a pop-up box asking whether to insert the domain specific structural element(s) into the template.

If there is more than one structural element including the identified concept, a ranked list may be provided. Ranking may be implemented based on, for example, the frequency of use of the elements or by analyzing the context of the text using NLP. In one example, if a "ventricle" is mentioned in a certain proximity of words containing "cardio" or "heart", then it is more likely that the heart chamber is meant and not a cerebral ventricle. Thus, in this case, the heart chamber would be presented before (e.g., to the left) of the cerebral ventricle suggestion.

At step S306, the editor 102 inserts the corresponding domain specific structural element(s) into the template based on the user's selection.

Returning to step S304, if the candidate does not exist in the library of existing domain specific structures, then the editor 102 calls the rules engine 106, which applies a set of rules to insert structural content in place of the candidate at step S308. In this case, the rules engine 106 attempts to match a set of rules, starting with more specific context sensitive rules and then applying a more generic rule.

For example, instead of the domain specific structural elements database 112, the rules engine 106 accesses and searches the domain ontology database 108 to locate structural elements matching the candidate. In one example, the rules engine 106 identifies the concept in the domain ontology corresponding to the candidate, and suggests replacing the candidate with a pick list such that the "parent" of the concept in the ontology serves as a label for the pick list, the "siblings" are suggested as alternative options, and the concept itself as default value of the pick list.

An example of a more generic rule identifies enumerations of "siblings," and the editor 102 suggests a multi-selection pick-list or a pick box.

Still referring to step S308, the editor 102 inserts the structural content into the template based on the user's selection of one of the presented options. The options may be presented in a pop-up box or other dialog window as well as any other suitable manner.

Once the rules engine 106 has applied the necessary rules and desired structural content has been entered, the process terminates until another candidate for structural content in the document is identified.

The process shown in FIG. 15 may be used to generate a template (a structured document) from an at least partly unstructured "plain text" document. In so doing, unstructured "plain text" parts of the document are replaced with generic and/or domain specific structure elements. With regard to the editor 102 shown in FIG. 2, this is reflected, for example, by replacing some plain text with a pick list. From a technical point of view, this may be achieved by enhancing the document itself with annotations (invisible to the user) or by creating an additional file containing such annotations. An annotation links some part of a document to a structural element. An example of a basic annotation is shown below. In this example, line 12 of the document being analyzed includes the text: "The nodule is located in the left lung."

text, "left lung",
    line, 12, startPos, 29, length, 9,
    code, RID1326

Basic annotations may be added by the auto complete functionality 104 on the fly. For example, given the context of a nodule in the first part of the sentence, an auto complete function may suggest "left lung" after the user types the first two letters "le" based on statistics of a couple of millions of radiology reports.

Based on this annotation, the rule engine 106 recognizes that in the RadLex ontology, "left lung" RID1326 is a child node of "lung" with RID1301. Accordingly, the rules engine 106 suggests replacing the text "left lung" with a pick list "[left lung|right lung]", since "right lung" RID1302 is the only sibling of "left lung".

In this example, if the user accepts the suggestion by the rules engine 106, then the annotation will be replaced by the following:
picklist,
line, 12, startPos, 29, length, 24,
code, RID1301,
optionList, "RID1326, RID1302"

The above example is simplified to convey the principle. In a realistic setting, the user may also determine, for example, if there is a default value and whether only one or both options can be selected. Accordingly, the annotations may be enhanced with, for example, default, RID1326, singleSelect.

More specific example applications of the method shown in FIG. 15 will now be described for example purposes.

A more specific application of the method shown in FIG. 15 will now be described with regard to FIGS. 11 and 16 for example purposes. However, it should be understood that the same or similar methods may be applied to other corresponding domain specific structural elements.

Referring to FIGS. 11, 15 and 16, while analyzing the document, the editor 102 identifies the text "moderately" in the "ABDOMEN" section as a candidate.

At step S304, the editor 102 determines whether the modifier "moderately" exists in the library of existing domain specific structures stored at the domain specific structural elements database 112.

Terms such as "moderately" (listed, e.g., in RadLex as "extent modifier" with ID RID5672) represent qualifiers or modifiers. The term "moderately" is an example of a term stored at the domain specific structural elements database 112.

Because the term "moderately" exists in the library of existing domain specific structures, the editor 102 obtains domain specific structural elements associated with "moderately", and suggests one or more pick lists to the user including the specific structural elements. In one example, possible pick lists containing "moderately" include:
[mildly|moderately|severely],
[not|mildly|moderately|severely|completely], or
[none|minor|moderate|major]. In one example, the editor 102 presents the one or more pick lists to the user by displaying a pop-up box asking the user to select a pick list including the modifier "moderately".

At step S306, the editor 102 inserts one of the presented pick lists into the template based on the user's selection.

As shown in FIG. 16, in this example, the user selects a relatively simple pick list including three extent modifiers defined in RadLex (i.e., [mildly|moderately|severely]). The user also identifies "moderately" as the default value, which becomes designated in bold.

The process then terminates until the editor 102 locates/identifies another candidate for structural content in the document.

According to at least some other example embodiments, the user may label the pick list or create a new pick list if the system does not suggest an appropriate pick list.

Another more specific application of the method shown in FIG. 15 will now be described with regard to FIGS. 11 and 16 for example purposes.

Referring again to FIGS. 11, 15 and 16, in this example, the editor 102 identifies the text "the head and the uncinate process" in the "ABDOMEN" section as a candidate. The text "the head and the uncinate process," is an example of an enumeration.

At step S304, the editor 102 determines whether at least a portion of the candidate enumeration exists in the library of existing domain specific structures stored at the domain specific structural elements database 112.

In this example, both "head" and "uncinate process" are concepts listed in SNOMED CT under the common parent concept "region of pancreas" with SNOMED CTID 279983000. Accordingly, the editor 102 may propose the following multi-select pick list made up of all regions of the pancreas listed in SNOMED CT because the candidate enumeration includes at least one concept that exists in the library of existing domain specific structures.

[lateral part|neck|body|incisura|tuber omentale|head|entire head|part of head|uncinate process|tail]

As shown in FIG. 16, the user is able to reduce to the above-discussed pick list to:
[lateral part|neck|body|head|uncinate process|tail].

At step S306, the editor 102 inserts one of the presented pick lists into the template based on the user's selection.

Yet another more specific application of the method shown in FIG. 15 will now be described with regard to FIGS. 11 and 16 for example purposes.

Referring again to FIGS. 11, 15 and 16, in this example, the editor 102 identifies the text "acute pancreatitis" in the "ABDOMEN" section as a candidate.

At step S304, the editor 102 determines whether the candidate "acute pancreatitis" exists in the library of existing domain specific structures stored at the domain specific structural elements database 112.

Because the candidate "acute pancreatitis" exists in the library of existing domain specific structures stored at the domain specific structural elements database 112, the editor 102 suggests creating a pick list of sub-types (e.g., 14 sub-types) of pancreatitis listed in SNOMED CT. As an alternative, the user may create his/her own pick list including, for example, acute pancreatitis and chronic pancreatitis.

In the example shown in FIG. 16, the user creates his own pick list including acute pancreatitis and chronic pancreatitis, and sets the default value to "acute pancreatitis."

This newly created pick list is also reused in the "Impression" section of the template as shown in FIG. 16.

Any one of the above-described and other example features of the present invention may be embodied in the form of an apparatus, method, system, computer program, tangible or non-transitory computer readable medium and tangible or non-transitory computer program product. For example, of the aforementioned methods may be embodied in the form of a system or device, including, but not limited to, any of the structure for performing the methodology illustrated in the drawings.

Further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments shown in the drawings being thus described, it will be obvious that the same may be varied in many ways. Such variations are not to be regarded as a departure from the scope of example embodiments, and all such modifications are intended to be included within the scope of example embodiments.

We claim:

1. A method of creating a template, the method comprising:
   identifying at least one domain ontology concept based on at least a portion of a first text-string input into a clinical document for a clinical indication;
   proposing, in the clinical document for the clinical indication, at least one name or label corresponding to the at least one domain ontology concept for selection by a user;
   inserting the at least one name or label corresponding to the at least one domain ontology concept into the clinical document for the clinical indication in response to selection of the at least one name or label by the user, the clinical document including documentation of at least clinical observations by a physician, the inserting the at least one name or label including auto-completing the first text string based on the identified at least one domain ontology concept and a context of the portion of the first text string in the clinical document;
   analyzing the clinical document to identify at least one first candidate for structural content in the clinical document, the at least one first candidate for structural content including a free form second text-string entry input into the clinical document by the user;
   obtaining at least one domain specific structural element associated with at least one further domain ontology concept corresponding to the identified at least one first candidate, the at least one domain specific structural element including the at least one first candidate and a plurality of second candidates, the plurality of second candidates being additional concepts identified as siblings of the at least one first candidate, wherein
      if the at least one first candidate exists in a library of existing domain specific structures, the obtaining step obtains the at least one domain specific structural element from the library of existing domain specific structures, and the plurality of second candidates are additional concepts identified as siblings of the at least one first candidate in the library of existing domain specific structures, and
      if the at least one first candidate does not exist in the library of existing domain specific structures, the obtaining step obtains the at least one domain specific structural element from a domain ontology database based on a parent node corresponding to the at least one first candidate; and
   creating a template corresponding to the clinical document by inserting, into the clinical document, structural content including the at least one domain specific structural element, the at least one domain specific structural element including the at least one candidate and the plurality of second candidates, wherein
      the structural content forms a structured part of the template for creating subsequent clinical documents for clinical indications,
      the plurality of second candidates are in the form of one or more third text-strings, and
      the at least one first candidate and the plurality of second candidates are displayed and selectable by the user for insertion into the subsequent clinical documents when creating the subsequent clinical documents from the created template.

2. The method of claim 1, wherein the first text string includes at least one domain ontology concept from among a set of domain ontology concepts.

3. The method of claim 1, further comprising:
   identifying the at least one further domain ontology concept in a domain ontology database based on the at least one first candidate.

4. A method of creating a template, the method comprising:
   auto-completing a first text string based on at least one domain ontology concept and a context of a portion of the first text string in a clinical document for a clinical indication;
   analyzing the clinical document to identify at least one first candidate for structural content, the clinical document including documentation of at least clinical observations by a physician, the at least one first candidate for structural content including a free form second text-string entry input into the clinical document by a user;
   determining whether the at least one first candidate exists in a library of existing domain specific structures; and
   creating a template corresponding to the clinical document by inserting, into the clinical document for the clinical indication, at least one domain specific structural element; wherein
      the at least one domain specific structural element includes the at least one first candidate and a plurality of second candidates,
      if the at least one first candidate exists in the library of existing domain specific structures, the inserting step inserts the at least one domain specific structural element from the library of existing domain specific structures based on the at least one first candidate, and the plurality of second candidates are additional concepts identified as siblings of the at least one first candidate in the library of existing domain specific structures,
      if the at least one first candidate does not exist in the library of existing domain specific structures, the inserting step inserts the at least one domain specific structural element based on a parent node, the parent node being identified based on the at least one first candidate;
      the at least one domain specific structural element forms a structured part of the template for creating subsequent clinical documents for subsequent clinical indications,
      the plurality of second candidates are in the form of one or more third text-strings, and
      the at least one first candidate and the plurality of second candidates are displayed and selectable by the user for insertion into the subsequent clinical documents when creating the subsequent clinical documents from the created template.

5. The method of claim 4, wherein the structured part of the template includes a pick list including children of the identified parent node as an option, the children of the identified parent node including the at least one first candidate and the plurality of second candidates.

6. A method of creating a template, the method comprising:
auto-completing a first text string based on at least one domain ontology concept and a context of a portion of the first text string in a clinical document for a clinical indication;
analyzing the clinical document to identify at least one first candidate for structural content, the clinical document including documentation of at least clinical observations by a physician, the at least one first candidate for structural content including a free form second text-string entry input into the clinical document by a user;
identifying a parent node corresponding to the at least one first candidate in a domain ontology database;
obtaining at least one domain specific structural element from the domain ontology database based on the identified parent node, the at least one domain specific structural element including the at least one first candidate and a plurality of second candidates, the plurality of second candidates being additional concepts identified as siblings of the at least one first candidate; and
creating a template corresponding to the clinical document by inserting, into the clinical document for the clinical indication, structural content including the at least one domain specific structural element, the at least one domain specific structural element including the at least one first candidate and the plurality of second candidates, wherein
the structural content forms a structured part of the template for creating subsequent clinical documents for subsequent clinical indications,
the plurality of second candidates are in the form of one or more third text-strings, and
the at least one first candidate and the plurality of second candidates are displayed and selectable by the user for insertion into the subsequent clinical documents when creating the subsequent clinical documents from the created template.

7. The method of claim 6, wherein the structured part of the template includes a pick list including children of the identified parent node as an option, the children including the at least one first candidate and the plurality of second candidates.

8. A document and template creation system comprising:
a document and template creation device including a processor and a memory, the processor configured to execute computer-readable instructions to,
identify at least one domain ontology concept based on at least a portion of a first text-string input into a clinical document for a clinical indication,
propose, in the clinical document for the clinical indication, at least one name or label corresponding to the at least one domain ontology concept for selection by a user,
insert the at least one name or label corresponding to the at least one domain ontology concept into the clinical document for the clinical indication in response to selection of the at least one name or label by the user, the clinical document including documentation of at least clinical observations by a physician, wherein
the processor is further configured to execute computer-readable instructions to insert the at least one name or label by auto-completing the first text string based on the identified at least one domain ontology concept and a context of the portion of the first text string in the clinical document,
analyze the clinical document to identify at least one first candidate for structural content in the clinical document, the at least one first candidate for structural content including a free form second text-string entry input into the clinical document by the user,
obtain at least one domain specific structural element associated with at least one further domain ontology concept corresponding to the identified at least one first candidate, the at least one domain specific structural element including the at least one first candidate and a plurality of second candidates, the plurality of second candidates being additional concepts identified as siblings of the at least one first candidate, wherein
if the at least one first candidate exists in a library of existing domain specific structures, the processor is further configured to execute computer-readable instructions to obtain the at least one domain specific structural element from the library of existing domain specific structures, and the plurality of second candidates are additional concepts identified as siblings of the at least one first candidate in the library of existing domain specific structures, and
if the at least one first candidate does not exist in the library of existing domain specific structures, the processor is further configured to execute computer-readable instructions to obtain the at least one domain specific structural element from a domain ontology database based on a parent node corresponding to the at least one first candidate, and
create a template corresponding to the clinical document by inserting, into the clinical document, structural content including the at least one domain specific structural element, the at least one domain specific structural element including the at least one first candidate and the plurality of second candidates, wherein
the structural content forms a structured part of the template for creating subsequent clinical documents for clinical indications,
the plurality of second candidates are in the form of one or more third text-strings, and
the at least one first candidate and the plurality of second candidates are displayed and selectable by the user for insertion into the subsequent clinical documents when creating the subsequent clinical documents from the created template.

9. The system of claim 8, wherein the first text string includes at least one domain ontology concept from among a set of domain ontology concepts.

10. The system of claim 8, wherein the processor is further configured to execute computer-readable instructions to identify the at least one further domain ontology concept in a domain ontology database based on the at least one first candidate.

11. A document and template creation system comprising:
a document and template creation device including a processor and a memory, the processor configured to execute computer-readable instructions to,
auto-complete a first text string based on at least one domain ontology concept and a context of a portion of the first text string in a clinical document for a clinical indication;
analyze the clinical document to identify at least one first candidate for structural content, the clinical document including documentation of at least clinical observations by a physician, the at least one first candidate for structural content including a free form second text-string entry input into the clinical document by a user, determine whether the at least one first candidate exists in a library of existing domain specific structures, and create a template corresponding to the clinical document by inserting, into the clinical document for the clinical indication, at least one domain specific structural element, wherein the at least one domain specific structural element includes the at least one first candidate and a plurality of second candidates, if the at least one first candidate exists in the library of existing domain specific structures, the processor is further configured to execute computer-readable instructions to insert the at least one domain specific structural element from the library of existing domain specific structures based on the at least one first candidate, and the plurality of second candidates are additional concepts identified as siblings of the at least one first candidate in the library of existing domain specific structures, wherein if the at least one first candidate does not exist in the library of existing domain specific structures, the processor is further configured to execute computer-readable instructions to insert the at least one domain specific structural element based on a parent node, the parent node being identified based on the at least one first candidate, the at least one domain specific structural element forms a structured part of the template for creating subsequent clinical documents for subsequent clinical indications, the plurality of second candidates are in the form of one or more third text-strings, and the at least one first candidate and the plurality of second candidates are displayed and selectable by the user for insertion into the subsequent clinical documents when creating the subsequent clinical documents from the created template.

12. The system of claim 11, wherein the structured part of the template includes a pick list including children of the identified parent node as an option, the children including the at least one first candidate and the plurality of second candidates.

13. A document and template creation system comprising:
a document and template creation device including a processor and a memory, the processor configured to execute computer-readable instructions to, auto-complete a first text string based on at least one domain ontology concept and a context of a portion of the first text string in a clinical document for a clinical indication;

analyze the clinical document to identify at least one first candidate for structural content, the clinical document including documentation of at least clinical observations by a physician, the at least one first candidate for structural content including a free form second text-string entry input into the clinical document by a user, identify a parent node corresponding to the at least one first candidate in a domain ontology database, obtain at least one domain specific structural element from the domain ontology database based on the identified parent node, the at least one domain specific structural element including the at least one first candidate and a plurality of second candidates, the plurality of second candidates being additional concepts identified as siblings of the at least one first candidate, and create a template for the clinical document by inserting, into the clinical document for the clinical indication, structural content including the at least one domain specific structural element, the at least one domain specific structural element including the at least one first candidate and the plurality of second candidates, wherein the structural content forms a structured part of the template for creating subsequent clinical documents for subsequent clinical indications, the plurality of second candidates are in the form of one or more third text-strings, and the at least one first candidate and the plurality of second candidates are displayed and selectable by the user for insertion into the subsequent clinical documents when creating the subsequent clinical documents from the created template.

14. The system of claim 13, wherein the structured part of the template includes a pick list including children of the identified parent node as an option, the children including the at least one first candidate and the plurality of second candidates.

15. A non-transitory computer readable medium storing including program segments for, when executed on a computer device, causing the computer device to implement the method of claim 1.

16. A non-transitory computer readable medium storing including program segments for, when executed on a computer device, causing the computer device to implement the method of claim 4.

17. A non-transitory computer readable medium storing including program segments for, when executed on a computer device, causing the computer device to implement the method of claim 6.

* * * * *